United States Patent [19]
Schweizer

[11] Patent Number: 6,109,633
[45] Date of Patent: Aug. 29, 2000

[54] BICYCLE CAPABLE OF VERTICAL MOTION

[76] Inventor: Jochen Schweizer, Bettinastrasse 22, D-81739 Munich, Germany

[21] Appl. No.: 08/956,801

[22] Filed: Oct. 23, 1997

[30] Foreign Application Priority Data

Feb. 4, 1997 [DE] Germany .............................. 197 04 101
Apr. 30, 1997 [DE] Germany ........................ 297 07 841 U

[51] Int. Cl.[7] ..................................................... B62M 1/02
[52] U.S. Cl. .......................................... 280/260; 446/440
[58] Field of Search ............................. 280/260; 446/315, 446/440; 182/42

[56] References Cited

U.S. PATENT DOCUMENTS

| | | | |
|---|---|---|---|
| 4,603,839 | 8/1986 | Ekman et al. ........................... | 254/329 |
| 4,681,301 | 7/1987 | Rinio ....................................... | 254/333 |
| 4,793,436 | 12/1988 | Lew et al. ................................ | 182/42 |
| 5,727,981 | 3/1998 | Meng-Suen ............................. | 446/315 |
| 5,743,781 | 4/1998 | Lee ......................................... | 446/315 |

*Primary Examiner*—Paul N. Dickson
*Assistant Examiner*—Michael Cuff
*Attorney, Agent, or Firm*—Collard & Roe, P.C.

[57] ABSTRACT

A vehicle in the form of a bicycle with a crankset drive, which is in active frictioned gripping or positive connection with a strand extending substantially vertically. The bicycle according to the invention is therefore capable of riding along the vertical strand.

17 Claims, 3 Drawing Sheets

BICYCLE CAPABLE OF VERTICAL MOTION

BACKGROUND OF THE INVENTION

1. Field of the Invention

The invention relates to a vehicle having at least one crankshaft drive capable of being actuated by muscular power, in particular a bicycle.

2. The Prior Art

Various bicycle designs are known from the state of the art, whereby such bicycles are designed in such a way that riding is possible only on horizontal or slanted grounds. It is basically impossible with known bicycles to ride in the vertical direction.

SUMMARY OF THE INVENTION

It therefore an object of the present invention to design a vehicle of the type specified above in such a way to enable vertical rides.

Due to the proposed friction gripping connection between the crankset drive of the bicycle and a substantially vertically-extending strand, the bicycle can move along the strand in the vertical direction. The strand, which is preferably a rope, chain or perforated belt, is secured at its top end on a fixing point, such as a building, preferably a tower, or a bridge. If suitable buildings are not available as fixing points, the top end of the strand can be secured on a crane. The stand is either freely suspended from such a fixing point or fixed at its bottom end as well.

A strand freely suspended at its bottom end offers the rider the additional thrill of swinging while he or she is riding which, however, also makes riding that much more difficult. Particularly when participating with such a bicycle in sport competitions, a freely suspended strand means that power and endurance are important, as well as the skill of the rider.

The friction gripping connection with the crankset drive, as opposed to a cable drum, provides for constant transmission ratios between the rate of revolutions of the crankset and the riding speed throughout the entire ride, because the strand is not wound up. Therefore, basically no derailleur gear is needed on the bicycle. However, when such derailleur gear is provided, the rider can select the speed suitable for given ride conditions, and retain that speed throughout the ride. This is important because the crankset drive of the vehicle is constantly highly stressed when riding in the upward direction, which makes throw-over of the drive chain to another chain ring and thus changing gear more difficult. However, changing gears while riding becomes superfluous due to the proposed design of the bicycle.

The friction gripping connection with the strand via a driven rotary element can be realized in a particularly simple way. No transmissions are required for translating the rotary motion of the crankset drive into other types of motion. The rotary element can be mounted directly on the shaft of the crankset, so that a conventional bicycle can be adapted to the new task with minimal expenditure. However, the rotary element is preferably non-positively connected with the rear wheel of the bicycle driven by the crankset, so that power is transmitted between the crankset and the rotary element via the drive chain of the bicycle. Any variable speed gear on the bicycle and the rear wheel brake can be jointly used in this way as well. Other types of transmission, for example by toothed gears, are of course conceivable as well. However, this would increase the re-equipping cost.

Providing for a variable speed gear offers the advantage that the bicycle can be easily adapted to different power and weight conditions of the rider. For example, a heavy-set beginner requires relatively low-gear transmission in order to be able to ride up the strand. On the other hand, a well-trained athlete will prefer high-gear transmission so as to be able to ride up at a faster speed. When a variable speed gear is used, the bicycle can be used universally.

A friction-grip type connection is advantageously formed by a capstan, which permits continuous passage of the strand in a particularly simple way. A capstan is a rotary element having a diameter expanding toward both axial ends. The strand enters the capstan rear of the widening diameter and loops around the capstan at least once, and preferably two to three times. The force generated between the entering strand and the capstan leads to displacement of the windings of the strand in the direction in which it runs off. This ensures that while riding, the strand always assumes the same position in relation to the capstan. This also ensures that the strand is looped around the capstan always in the same way, thus exerting a constant frictional force on the capstan.

A particularly favorable design of the capstan has a jacket surface having a diameter that widens at both ends and at different angles. The different pitch angles of the diameter-widening zones of the jacket surface of the capstan permit favorable adaptation of the capstan to the different loads during up and down rides. This capstan is arranged in such a way that when riding up the strand, the strand enters the capstan at its flatter end, and exits from the capstan at its steeper end. When riding down, the strand accordingly enters the capstan at its stepper end. This ensures that the lateral displacement forces acting on the strand are approximately the same when riding up and down the strand, in spite of considerable varying stresses acting on the strand.

In order to safely prevent the strand from sliding from the capstan, there is preferably a guiding surface extending at the end of the capstan perpendicular to its axis. Provision can be made for such a guiding surface at both ends of the capstan. However, alternatively, it may suffice if such a guiding surface is present only on the flatter end of the capstan. This measure ensures that the capstan has an adequate outside diameter at both of its ends for safely guiding the strand without having to design the capstan with unnecessarily great length.

As an alternative to a capstan, it is also possible to form the friction gripping connection by a driving disk. Such a driving disk keeps the strand seated and clamped in a groove extending all around, and in this way ensures sufficient friction gripping interaction with the strand in spite of the lesser looping angle. A V-shaped cross section has been successfully used for the groove because the strand, due to its tensile force, penetrates the groove just deep enough to obtain an adequate friction grip. In particular, the friction of the strand does not significantly depend on the diameter of the strand, so that when a thinner strand is used, no reduction in the friction of the strand is caused that would be hazardous to the rider.

So as to increase the friction of the strand further, the circumferential groove preferably has a corrugated shape. In this way, the strand seized by the driving disk is reversed a number of times in the axial direction of the disk, so that it is pressed even more forcefully against the groove of the driving disk, finding an increased frictional surface.

Fixing or pretensioning the bottom end of the strand increases the tensile force of the strand and thus serves to further increase the friction grip of the crankset with the strand. This raises the gripping and holding safety, on the one hand, and makes it possible, on the other hand, to reduce the number of windings around the capstan. Furthermore, this measure stabilizes the strand in its position, which reduces lateral swaying of the bicycle with the strand. This simplifies riding along the strand and thus requires less skill on part of the rider.

As an alternative to a friction gripping connection, it is possible to form a positive connection by using a toothed gear engaging a chain, perforated belt, toothed belt, or toothed rack. This is slightly more costly than the friction gripping connection described above. However, a positive connection offers the special advantage that good power transmission is constantly ensured irrespective of the load, and thus regardless of which riding direction is selected. Therefore, the transmission of power between the bicycle and the strand is particularly safe and, furthermore, entirely independent of any external influences such as the weather.

Particularly when the friction gripping or positive connection between the bicycle and the strand is made on the crankset drive or rear axle of the bicycle, the problem arises that the center of gravity of the bicycle and rider is generally located above the point of engagement with the strand. The rider, therefore, is in an instable equilibrium, which requires such rider to be specially skilled in maintaining balance. So as to achieve a stable balance in this case, provision is made on the bicycle for a guide supported on the strand and extending above the center of gravity of the bicycle and rider. The top end of the guide thus forms a point of support, and the center of gravity of the system comprising the bicycle and the rider is located below this support point. The bicycle, therefore, is in a stable equilibrium, and the position of the bicycle varies only slightly around a position of balance without any action on the part of the rider. Preferably, the equilibrium is adjusted in such a way that the line of connection between the rear wheel and front wheel of the bicycle is inclined slightly upwardly.

The guide on the strand could be a roller secured on the bicycle and spaced therefrom; which seizes the strand with particularly low friction. As an alternative, it is proposed that the guide be a sliding part, as such a part can be manufactured in simpler ways as compared to a roller, and is also safer to use.

Designing the sliding part in the form of a tube is particularly safe, because the strand is guided enclosed in the tube and is thus not capable of jumping from the guide. Since a tube is inherently stable, no further retaining measures are required at its upper end, so that only the bottom of the tube needs to be secured on the frame of the bicycle. This results in a simple structure for the bicycle, so that few reconstruction measures are required to convert a conventional bicycle to one according to the invention.

Forming the tube into a curved shape permits guiding the strand around the rider in a particularly simple way, without causing any excessive friction between the strand and the tube. In addition, the tube can be lined on the inside with material having a smoothly gliding surface such as polytetrafluoroethylene, in order to further reduce friction with the strand. Furthermore, the rider is protected against the strand.

In order to avoid damage to the strand, the tube is flexible at its top end. In this way, the top end of the tube can compensate for any swaying movements of the bicycle, and thus prevent buckling of the strand. The flexible end piece ensures smooth entry of the strand into the tube and acts like a protective cable bushing, such as is known with plugs of electric cables. Buckling of the strand is a drawback not only because it may cause damage to the strand, but also in that any such kink would brake the ride, because the strand can no longer be smoothly inserted in the tube.

It is advantageous to provide a braking device on the bicycle. If the rotary element interacting with the strand is located on a wheel of the bicycle, the operating brake acting on such wheel can be applied directly. For increasing safety, it is preferred that at least one additional brake acting on the wheel of the bicycle or directly on the strand is provided. Such brake increases the safety of the rider and prevents any free fall if the operating brake of the bicycle fails. The brake device preferably acts in such a way that starting with a preset falling speed, it causes wedging on the strand, thereby retarding the falling motion. The brake device could be mounted on or in the tube.

Finally, it is preferable to equip the crankset drive with a freewheel or chain derailleur device in order to avoid forced rotation of the crankset when the bicycle is moving down the strand. This makes downward rides easier for the rider, as no pedalling is required.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
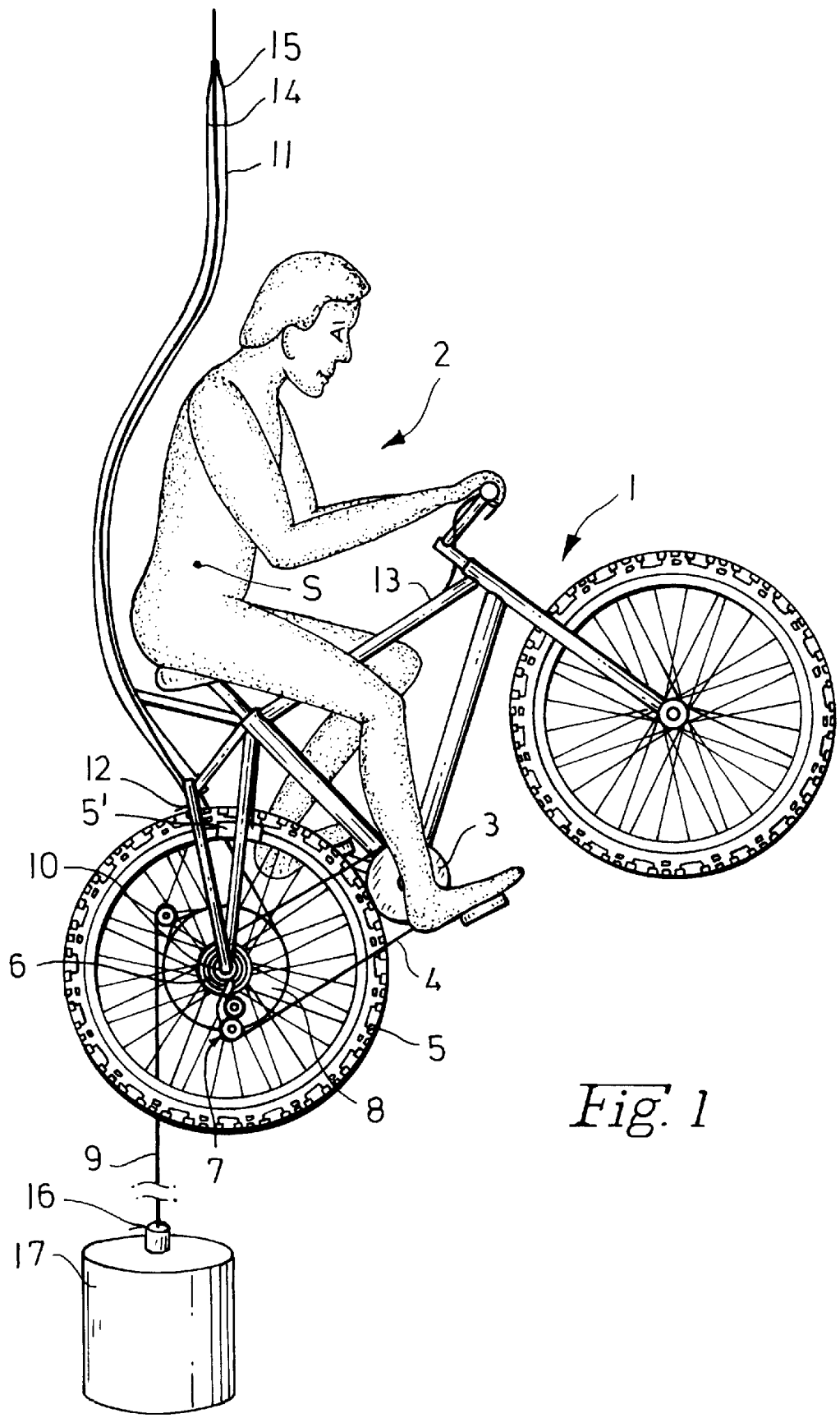
FIG. 1 shows a lateral view of a preferred embodiment of the invention.

Referring now in detail to the drawings and, in particular, FIG. 1, there is shown a bicycle 1 with a rider 2. On bicycle 1, provision is made for a crankset drive 3, which can be put into rotation by rider 2. The rotary motion of crankset 3 is transmitted to a rear wheel 5 of bicycle 1 by a drive chain 4. For such transmission, rear wheel 5 has a number of toothed rims 6 forming a change-over gear 7. It is possible in this way to adjust the transmission ratio between the rate of revolutions of crankset 3 and the rate of revolutions of rear wheel 5 in stages. Rear wheel 5 is actively connected with brake 5', which is required for a braked and thus safe ride down the strand.

A driving disk 8 is secured on rear wheel 5. The rotary motion of rear wheel 5 is directly transmitted to driving disk 8. Driving disk 8 is grippingly connected by friction with a strand 9 in the form of a rope, which extends substantially vertically. Driving disk 8 is partially looped by strand 9 within a part zone, so that strand 9 is reversed. So that the downwardly leading section of strand 9 is realigned approximately vertically downwardly, strand 9 is reversed by a reversing roller 10, which in turn is supported on bicycle 1.

In order to obtain a stable balance for bicycle 1, strand 9 is guided in a tube 11 (shown by a sectional view), with the bottom end 12 of tube 11 being secured on bicycle frame 13. On the inside, tube 11 is coated with a gliding layer consisting of polytetrafluoroethylene in order to reduce the friction with strand 9. At its top end 14, tube 11 has a flexible end piece 15, which permits tube 11 to adapt to possible swaying movements of bicycle 1 without buckling strand 9. This ensures that strand 9 is smoothly fed into tube 11. Tube 11 is curved in such a way that it guides strand 9 around rider 2, so that the top end 14 of tube 11 is located above the center of gravity "S" of bicycle 1 and rider 2. This assures stable balance of bicycle 1. Bottom end 16 of strand 9 is pretensioned by means of a weight 17 in order to increase the frictional grip between strand 9 and driving disk 8. Alternatively, strand 9 can be secured at its bottom end 16 as well, such as by a spring.

Figures 2, 3, 4:
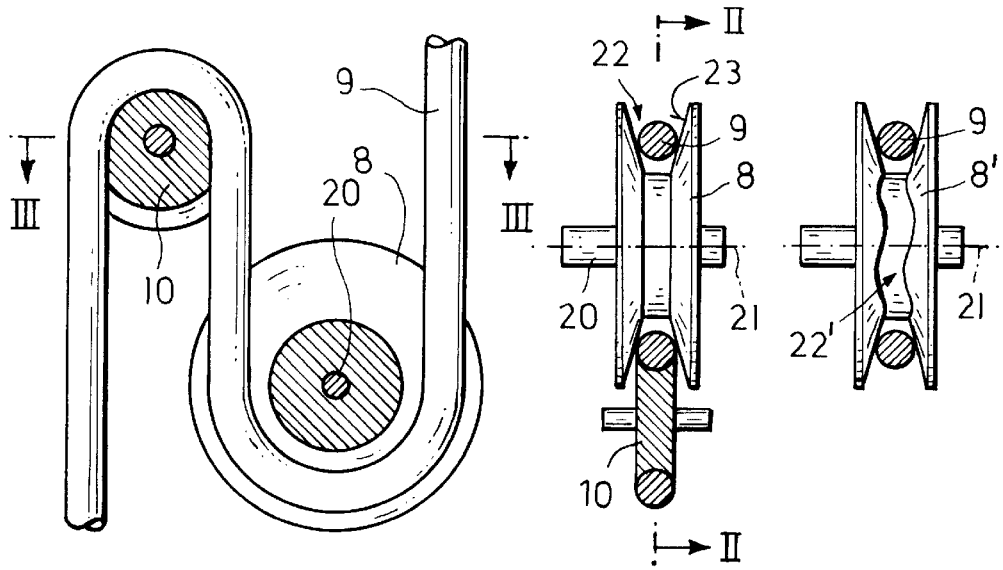
FIG. 2 shows a section through a driving disk with a reversing roller.
FIG. 3 shows a section through an arrangement according to FIG. 2 along line III—III.
FIG. 4 shows an alternative design of the driving disk.

FIGS. 2 and 3 show sectional representations of driving disk 8 and reversing roller 10. Driving disk 8 is mounted on shaft 20. Shaft 20 has an axis 21 that coincides with the axis of rear wheel 5 of bicycle 1. Driving disk 8 has a V-shaped groove 22, in which strand 9 is guided with frictioned gripping. V-shaped groove 22 is made narrow, so that strand 9 rests against flanks 23 of groove 22. In this way, strand 9, in accordance with its diameter, penetrates groove 22 just deep enough to provide it with adequate friction grip on flanks 23. Strand 9 loops around driving disk 8 by 180°, and accordingly is reversed from down to up. Such reversing of strand 9 is compensated by reversing roller 10, which is not driven. Roller 10 further reverses strand 9 by 180°.

FIG. 4 shows an alternative embodiment of driving disk 8'. Driving disk 8' has a V-shaped groove 22', which is corrugated in the axial direction. Rope 9 is forced in this way to deform itself in accordance with the corrugation of groove 22'. This results in a particularly solid frictioned gripping connection between driving disk 8' and rope 9, so that the looping angle between the two can be reduced, if need be.

Figures 5, 6:
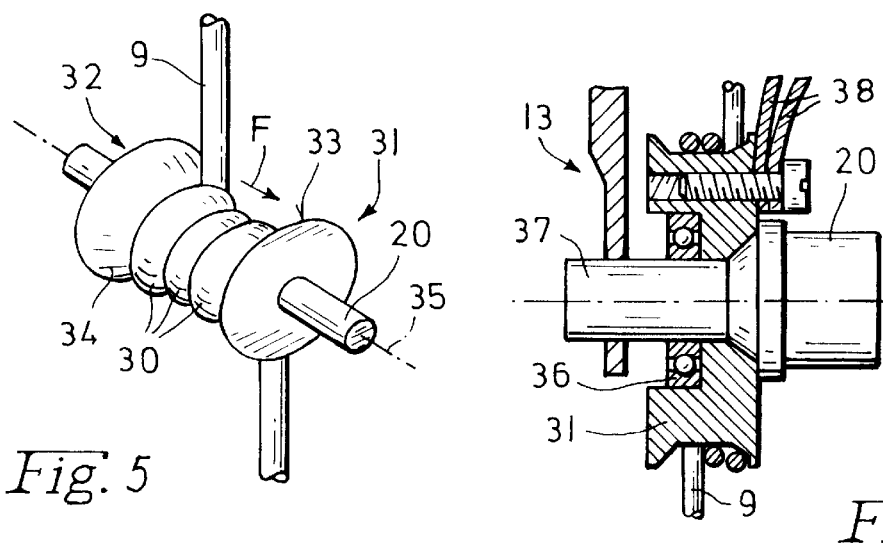
FIG. 5 shows a three-dimensional view of a capstan.
FIG. 6 shows a section through the rear axle of the bicycle, the latter being equipped with a capstan.

FIG. 5 shows a three-dimensional representation of another embodiment for forming a friction grip connection with rope 9. In this embodiment, rope 9 is looped with three windings 30 around a capstan 31, which is mounted on shaft 20 of the rear axle of the bicycle. Capstan 31 is designed with diameters expanding toward both ends 32 and 33, so that rope 9 runs upon a conical surface 34 of capstan 31. In this way, the clamping force of rope 9 causes a pushing force "F" to act on rope 9, in the direction of capstan axis 35. This is important to prevent rope 9 from being wound on end 32 of capstan 31 as capstan 31 is turning, which would reduce the number of windings 30 of rope 9.

FIG. 6 shows a sectional view with a cut through capstan 31. Capstan 31 is torsionally rigidly mounted on shaft 20 of rear bicycle wheel 4, so that capstan 31 is driven and rotated by rear wheel 5. Via a ball bearing 36, capstan 31 is supported on a support shaft 37 forming part of bicycle frame 13. Spokes 38 of rear wheel 5 are secured on capstan 31 as well.

Figure 7:
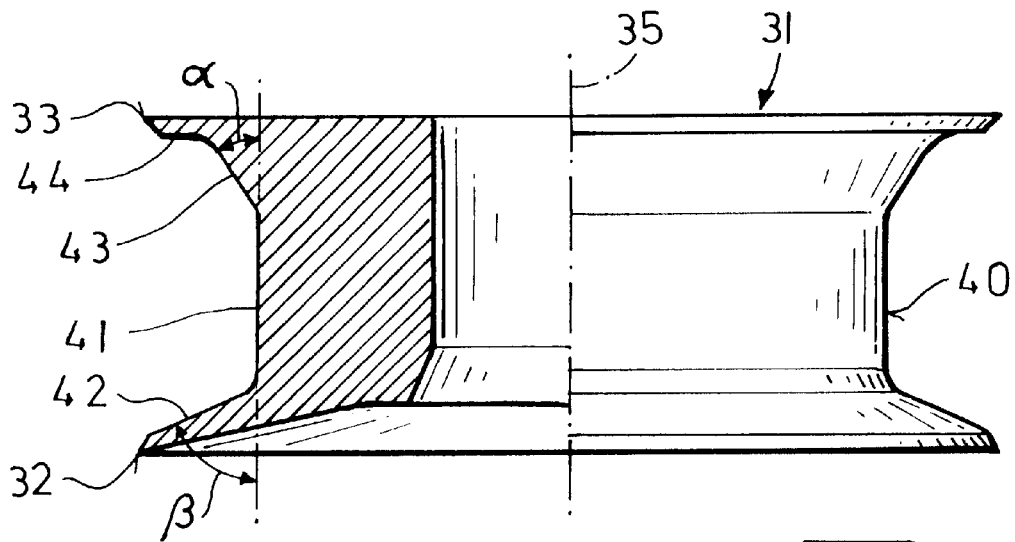
FIG. 7 shows a section through a capstan.

The shape of capstan 31 is clearly shown by the half-sectional representation according to FIG. 7. Capstan 37 has a capstan jacket surface 40, the center zone of which is formed by a cylinder surface 41. The diameter of capstan jacket surface 40 widens on both sides of the cylindrical surface 41 in the form of conical surfaces 42 and 43. Conical surfaces 42 and capstan axis 35 jointly enclose a larger angle a than the opposite conical surface 43 (angle β). Capstan 31 is mounted here in such a way that rope 9, when riding the bicycle up the rope, runs up on the flatter conical surface 43, as shown particularly in FIG. 6. This way, the load acting on the rope, which is considerably higher when bicycle 1 is riding up, is compensated, so that the forces of lateral displacement "F" acting on rope 9 are about the same when riding up and down the rope. So as to ensure an adequate end diameter of capstan 31 for safe rope guidance even with the flatter conical surface 43, capstan jacket surface 40 has, at the end of conical surface 43, a guiding surface 44 extending perpendicular to capstan axis 35. Provision for such guiding surface could be made at the other end of opposite conical surface 42 as well.

Figure 8:
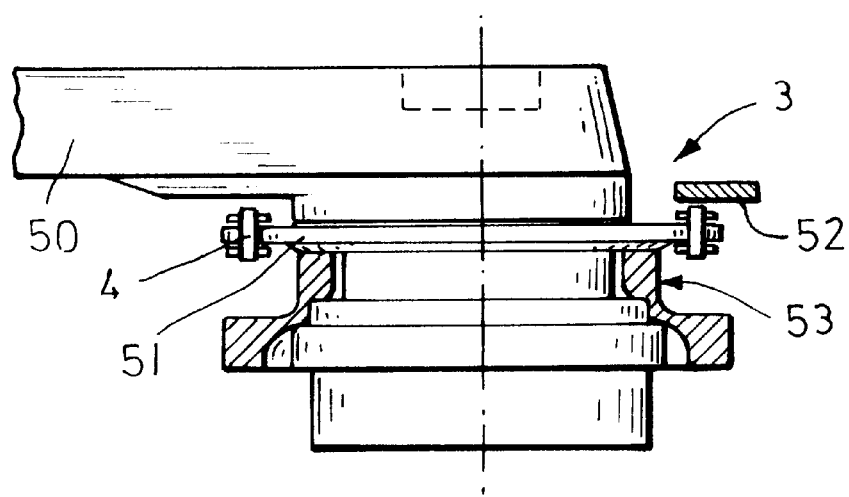
FIG. 8 shows a section through the crankset of the bicycle with a chain derailleur device.

FIG. 8 shows a partly sectional view of a cutout of crankset 3. Crankset 3 consists of a crank 50, on which a pedal (not shown) is supported. Crank 50 is torsionally rigidly joined with a toothed rim 51, which is partly looped by drive chain 4. Drive chain 4 can be thrown into a groove 53 by means of a chain derailleur 52, so that the active connection between crank 50 and drive chain 4 is canceled this permits riding bicycle 1 comfortably down rope 9 without putting crankset 3.

Accordingly, while only several embodiments of the present invention have been shown and described, it is obvious that many changes and modifications may be made thereunto without departing from the spirit and scope of the invention.

What is claimed is:

1. A bicycle capable of traveling up and down a vertical strand and powered by muscular force of at least one rider, comprising a crankset drive in active positive connection with the strand, wherein the positive connection is formed by at least one rotary element at least partially looped by the strand, said rotary element being rotatable by said crankset drive and mounted on a shaft of the rear wheel of the bicycle.

2. A bicycle according to claim 1, wherein the crankset drive is equipped with a chain derailleur.

3. A bicycle according to claim 1, wherein the positive connection is formed by a variable speed gear.

4. A bicycle according to claim 1, wherein the positive connection is formed by at least one capstan looped at least once by the strand, said capstan being rotatable by said crankset drive around a capstan axis.

5. A bicycle according to claim 4, wherein the capstan has two axial ends and a jacket surface having a diameter that widens at said two axial ends at different angles of inclination.

6. A bicycle according to claim 4, wherein the capstan has two axial ends and a guiding surface on at least one axial end, said guiding surface extending perpendicular to the capstan axis.

7. A bicycle according to claim 1, wherein the positive connection is formed by at least one driving disk having a circumferential groove for clamping the strand, said groove being rotatable by said crankset drive.

8. A bicycle according to claim 7, wherein the groove extends around the entire circumference of the driving disk and is corrugated in an axial direction.

9. A bicycle according to claim 1, wherein the strand is tensioned at its bottom end by a weight for increasing the friction of the connection between the strand and the crankset drive.

10. A bicycle according to claim 1, wherein the strand is secured to the ground to increase the friction of the connection between the strand and the crankset drive.

11. A bicycle according to claim 1, wherein the strand is comprised of a chain, toothed belt or perforated belt and the positive connection is formed by at least one toothed gear rotatable by the crankset drive, and wherein the strand extends around the toothed gear.

12. A bicycle according to claim 1, further comprising a guide arranged on the bicycle and supporting the strand, said guide extending substantially above the center of gravity of the bicycle.

13. A bicycle according to claim 12, wherein the guide is a sliding part that seizes the strand.

14. A bicycle according to claim 12, wherein the guide comprises a tube extending above the center of gravity of the bicycle and rider, wherein the strand is glidingly supported within the tube.

15. A bicycle according to claim 14, wherein the tube is curved and guides the strand around and above the rider.

16. A bicycle according to claim 14, wherein the tube has a flexible top end.

17. A bicycle according to claim 1, further comprising a braking device mounted on the bicycle and connected to the strand and adapted to retard falling motions of the bicycle.

* * * * *